(12) United States Patent
Davies et al.

(10) Patent No.: US 8,371,031 B2
(45) Date of Patent: Feb. 12, 2013

(54) CUTTING DEVICE

(75) Inventors: Christopher Davies, Kidwelly (GB); Nicholas James Mival, London (GB)

(73) Assignee: Belron Hungary Kft-Zug Branch, Zug (CH)

( * ) Notice: Subject to any disclaimer, the term of this patent is extended or adjusted under 35 U.S.C. 154(b) by 0 days.

(21) Appl. No.: 13/100,820

(22) Filed: May 4, 2011

(65) Prior Publication Data

US 2011/0203429 A1    Aug. 25, 2011

Related U.S. Application Data

(63) Continuation of application No. 11/175,931, filed on Jul. 6, 2005, now abandoned.

(30) Foreign Application Priority Data

Jul. 25, 2002  (GB) .................................. 0217215.3

(51) Int. Cl.
B26D 1/00        (2006.01)
B26B 29/06       (2006.01)

(52) U.S. Cl. ................................. 30/294; 30/289; 83/13

(58) Field of Classification Search ................ 33/27.03, 33/27.031, 42, 41.5; 30/294, 394, 519, 393, 30/164.95, 164.9, 300, 310, 392, 122; 83/876, 83/886, 745, 455; 225/96
See application file for complete search history.

(56) References Cited

U.S. PATENT DOCUMENTS

| | | |
|---|---|---|
| 396,600 A | 1/1889 | Rowland |
| 677,339 A | 7/1901 | Comstock |
| 953,407 A | 3/1910 | Braid |
| 959,311 A | 5/1910 | Chase, Jr. |
| 992,819 A | 5/1911 | Springer |
| 1,402,961 A | 1/1922 | Ratcliff |
| 1,421,921 A | 7/1922 | Doerr |
| 1,775,813 A * | 9/1930 | Colby ............................. 30/317 |
| 2,107,174 A | 1/1934 | Boice |
| 2,194,409 A | 8/1939 | Stangohr |
| 2,735,486 A | 2/1956 | Millard |
| 2,943,362 A | 7/1960 | Butler |
| 3,286,573 A | 11/1966 | Esch |
| 3,465,794 A | 9/1969 | McLauchlan et al. |
| 3,532,260 A | 10/1970 | Augustin et al. |
| 3,729,822 A | 5/1973 | Batson |
| 3,994,194 A | 11/1976 | Moceri |
| 4,044,464 A | 8/1977 | Schiess et al. |
| 4,110,907 A | 9/1978 | Einhorn et al. |
| 4,199,852 A * | 4/1980 | Ayers et al. ..................... 29/239 |
| 4,215,475 A | 8/1980 | Morford et al. |
| 4,395,825 A | 8/1983 | Lock |
| 4,539,467 A | 9/1985 | Wenger |
| 376,974 A | 1/1988 | Wunderlich |

(Continued)

FOREIGN PATENT DOCUMENTS

| | | |
|---|---|---|
| EP | 1 203 628 | 5/2002 |
| GB | 652466 | 4/1951 |

(Continued)

*Primary Examiner* — Ghassem Alie
(74) *Attorney, Agent, or Firm* — Gordon & Jacobson, P.C.

(57) ABSTRACT

A cutting device, particularly suited for removing vehicle glazing panels, has forward blade carrier and a rearward handle spaced from the forward blade carrier. The forward blade carrier may function as a handle, the device thereby being operable in two handed use. The rearward handle and forward blade may be movable relative to one another permitting re-configuration of the device. The rearward handle and forward blade carrier may be connected by a bridge portion.

22 Claims, 12 Drawing Sheets

U.S. PATENT DOCUMENTS

| | | |
|---|---|---|
| 4,807,361 A | 2/1989 | Raczkowski |
| 4,980,976 A | 1/1991 | Juninger et al. |
| 5,014,436 A | 5/1991 | Kozyrski et al. |
| 5,065,517 A | 11/1991 | Markes |
| 5,101,488 A | 3/1992 | Rosenthal et al. |
| 5,400,510 A | 3/1995 | Glodowski |
| 5,430,946 A | 7/1995 | Peters et al. |
| 5,485,607 A | 1/1996 | Lomet et al. |
| 5,509,187 A | 4/1996 | Gold |
| 5,662,017 A | 9/1997 | Mellon |
| 5,784,788 A | 7/1998 | Cothery |
| 5,895,183 A | 4/1999 | McDaniel et al. |
| 5,940,977 A | 8/1999 | Moores, Jr. |
| 6,138,364 A | 10/2000 | Schmitz |
| 6,357,326 B1 | 3/2002 | David |
| 6,401,342 B1 | 6/2002 | Kloss et al. |
| 2003/0110646 A1 | 6/2003 | Phillips et al. |

FOREIGN PATENT DOCUMENTS

| | | |
|---|---|---|
| GB | 836025 | 6/1960 |
| GB | 2158393 | 11/1985 |

\* cited by examiner

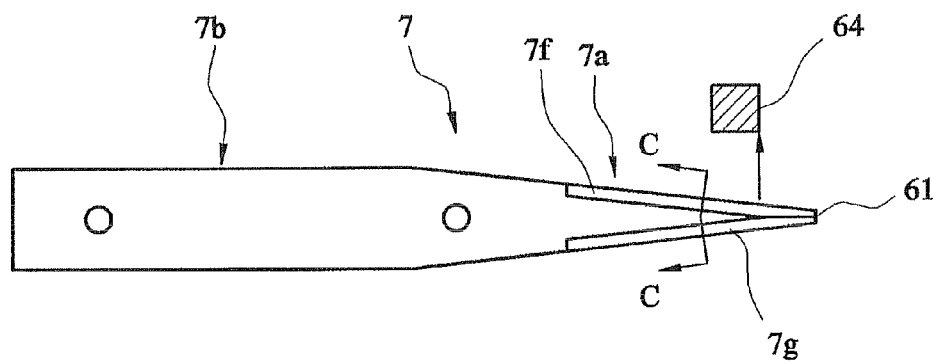
FIG. 9
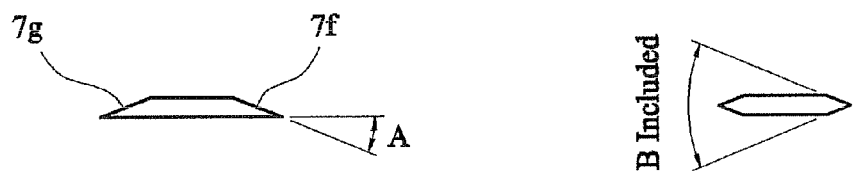
FIG. 10
FIG. 11
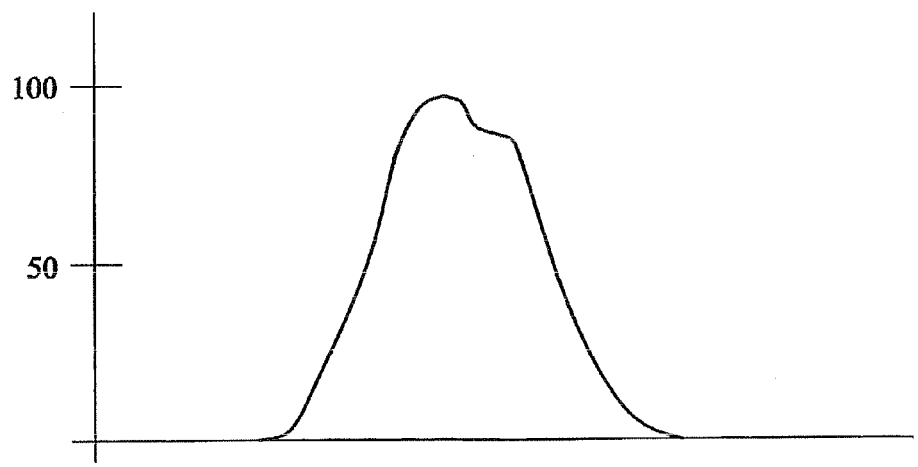
FIG. 12

| cut no | 50single | 40single | 30single | 20single | 50double | 40double | 30double | 20double | 30-1100 | WIZ |
|---|---|---|---|---|---|---|---|---|---|---|
| 1 | 134.52 | 98.88 | 95.46 | 52 | 89.36 | 91.55 | 56.4 | 65.92 | 44.43 | 179.69 |
| 2 | 120.61 | 83.5 | 80.32 | 53.22 | 66.43 | 72.75 | 54.2 | 61.04 | 48.58 | 146.48 |
| 3 |  |  |  |  | 74.71 |  |  |  |  |  |
| 5 |  | 85.45 | 66.89 | 55.42 | 75.93 | 63.96 | 51.27 | 60.3 | 45.17 | 133.54 |
| 7 | 113.04 |  |  |  |  |  |  |  |  |  |
| 9 |  | 85.45 | 65.92 | 54.2 | 74.71 | 71.29 | 50.05 | 59.81 | 40.77 | 133.3 |
| 10 | 112.06 |  |  |  |  |  |  |  |  |  |

CUTTING DEVICE

CROSS-REFERENCE TO RELATED APPLICATIONS

The present application is a continuation of U.S. application Ser. No. 11/175,931, filed on Jul. 6, 2005, which is a continuation of U.S. application Ser. No. 10/523,001, with a 371(c) date of May 12, 2008, which is a 371 national stage application of PCT/GB03/03251, filed Jul. 25, 2003, which claims priority from United Kingdom application 0217215.3, filed Jul. 25, 2002, all herein incorporated by reference in their entireties.

BACKGROUND OF THE INVENTION

The present invention relates to a cutting device and in particular to a hand held cutting device, primarily a cutout tool for use in cutting bonding materials such as polyurethane bonding material.

Bonded panels (vehicle or the like) may be released by using the device at perimeter accessible bonded zones of the panel. In particular, the device of the invention is particularly suitable for use in cutting or paring polyurethane bonding material used to bond vehicle panels such as vehicle windscreens in vehicle windscreen openings.

SUMMARY OF THE INVENTION

According to a first aspect, the present invention provides a cutting device comprising a forward blade carrier and a rearward handle spaced from the forward blade carrier, the rearward handle and forward blade carrier being movable relative to one another permitting re-configuration of the device.

Preferably, the rearward handle and forward blade carrier are lockable relative to one another permitting setting of the device in re-configured orientations.

The forward blade carrier typically acts as a forward handle for gripping by one of the user's hands. The rearward handle is gripped by the other of the user's hands. The spaced separate handles ensure that the device is ergonomically attractive and efficient to use.

Because the rearward handle can be moved to be reorientated relative to the forward blade carrier/handle, the device is convenient to use around corners or bends such as around the peripheral corner of a vehicle windscreen when the device is used for removing vehicle windscreens. Because the device locks in its reorientated configuration, the device is sturdy and safe for use.

Typically the rearward handle is moveable in a planetary orbit (rotationally) about the forward blade carrier. The rearward handle is preferably moveable through substantially 90° or more (more preferably 180°, or more preferably still 270°) about the forward blade carrier.

The rearward handle is arranged to be locked in a plurality of orientations relative to the forward blade carrier. The device preferably includes a lock arrangement for this purpose. The lock arrangement beneficially comprises a lock actuator accessible to the user of the device.

Beneficially a biasing arrangement is provided for biasing the lock arrangement normally to the locked position.

In order to facilitate the orbital movement of the rearward handle about the forward blade carrier, a rotatable mounting is beneficially provided at the blade carrier.

A bridge portion is typically provided extending between the rearward handle and the blade carrier, the bridge portion beneficially being arranged to move in unison with the rearward handle about the blade carrier. The bridge portion and rearward handle are typically effectively integral with one another. The forward end of the bridge portion is typically mounted rotatably at a rotatable mounting at the blade carrier. The rearward handle and the blade carrier depend downwardly from the bridge portion and preferably lie in substantially the same plane. The rearward handle and blade carrier are therefore substantially parallel (or have substantially parallel axes).

The device preferably includes a blade adjustment arrangement for adjusting the position of the blade relative to the blade carrier. The blade adjustment arrangement is beneficially adjustable by means of an actuator provided on the exterior of the device. The arrangement is actuatable to selectively vary the projecting distance of the blade from the blade carrier.

In one embodiment, the blade adjustment arrangement may include a ratchet mechanism to advance and/or retract the blade relative to the blade carrier.

Typically the blade carrier includes an internal receiving recess for receiving the blade. A blade retaining element is beneficially provided for securing the blade with the blade carrier; the blade retaining element is beneficially resiliently biased to a retaining position.

The device may include engagement means for engaging a substrate at a level spaced (upwardly) from the terminal portion of the blade. For example where the device is used for removing vehicle windscreens, the engagement means will engage the external surface of the windscreen proximate the peripheral edge thereof. The cutting portion of the blade is inserted through the bonding material on the underside surface of the windscreen. The engagement means is beneficially carried by the blade carrier and beneficially comprises rotatable engagement means such as for example a roller. As an alternative, a ski or skid may be provided.

The cutting blade typically comprises an elongate mounting portion for mounting to the blade carrier and a cutting portion extending substantially transversely to the mounting portion.

The cutting portion of the blade beneficially extends transversely to the plane in which the blade carrier and rearward handle lie. Beneficially the cutting portion of the blade tapers to an apex.

It is preferred that the device includes a lubrication arrangement for delivering lubricant to the blade.

Beneficially the lubrication arrangement includes a lubricant reservoir which is preferably provided internally of the rearward handle. Lubricant delivery means beneficially delivers the lubricant along the blade carrier to pass to the blade. The delivery means is beneficially arranged to deliver the lubricant to the blade along a path internally of the blade carrier. It is preferred that the lubricant delivery means includes a conduit spanning the bridge portion of the device. A lubricant injector or nozzle is beneficially provided for the blade carrier arranged to dispense the lubricant to the region of the blade. A lubricant delivery actuator is preferably mounted on the exterior of the device being actuatable preferably to pump the lubricant fluid.

According to a further aspect the invention provides a cutting device comprising a forward blade carrier, a rearward handle spaced from the forward blade carrier and a bridge portion interconnecting the forward blade carrier and the rearward handle which both depend from the bridge portion, the forward blade carrier providing a forward handle for the device, the forward blade carrier, rearward handle and bridge portion being in substantially the same plane.

According to a further aspect the invention provides a cutting device comprising a blade carrier, an engagement arrangement (such as a roller, for example) for setting the device against a surface, and a blade adjustment arrangement for adjusting the position of the blade relative to the blade carrier and/or the engagement arrangement.

According to a further aspect the invention provides a cutting device comprising a blade carrier and an engagement arrangement (such as a roller, for example) for setting the device against a surface such that the blade cuts at a predetermined cut plane relative to the engagement arrangement.

According to a further aspect the invention provides a hand held cutting device comprising a blade carrier and a lubrication arrangement for delivering lubricant to the blade via the blade carrier.

Preferred features of the invention as defined in these aspects are in accordance with preferred features of the invention as defined in accordance with the first mentioned aspect herein.

According to a further aspect, there is provided a blade for a cutting tool, the blade including a tapered cutting portion having opposed tapering cutting edges terminating at an apex portion of the blade, wherein:

i) at least one of the tapering cutting edges has a cutting edge bevel defining an angle of substantially 40° or less; and/or ii) both opposed tapering cutting edges have a cutting edge bevel; and/or iii) at least one of the tapering cutting edges has a cutting edge bevel on upper and lower portions of the blade defining a double bevel.

Beneficially at least one of the tapering cutting edges has a cutting edge bevel defining an angle of substantially 30° or less (more preferably substantially 25° or less).

It is preferred that both tapering cutting edges have a substantially corresponding degree of taper. Preferably both opposed tapering cutting edges have a substantially corresponding cutting edge bevel angle. In a preferred embodiment, both opposed tapering cutting edges have a substantially corresponding double bevel.

It is preferred that the blade includes a fixing portion extending in a direction substantially perpendicular to the tapered cutting portion, the fixing portion being configured to facilitate fixing to a tool or the like.

The invention will now be further described in specific embodiments, by way of example only, and with reference to the accompanying drawings.

BRIEF DESCRIPTION OF THE DRAWINGS

FIG. 9 is a schematic plan view of a test blade in accordance with the invention.

FIG. 10 is a schematic sectional view along C-C in FIG. 9 for a first embodiment of blade.

FIG. 11 is a sectional view along C-C in FIG. 9 for a second embodiment of blade.

FIG. 12 is a graphic representation of force encountered in using the blade of the invention.

DETAILED DESCRIPTION OF THE PREFERRED EMBODIMENT

Figure 1:
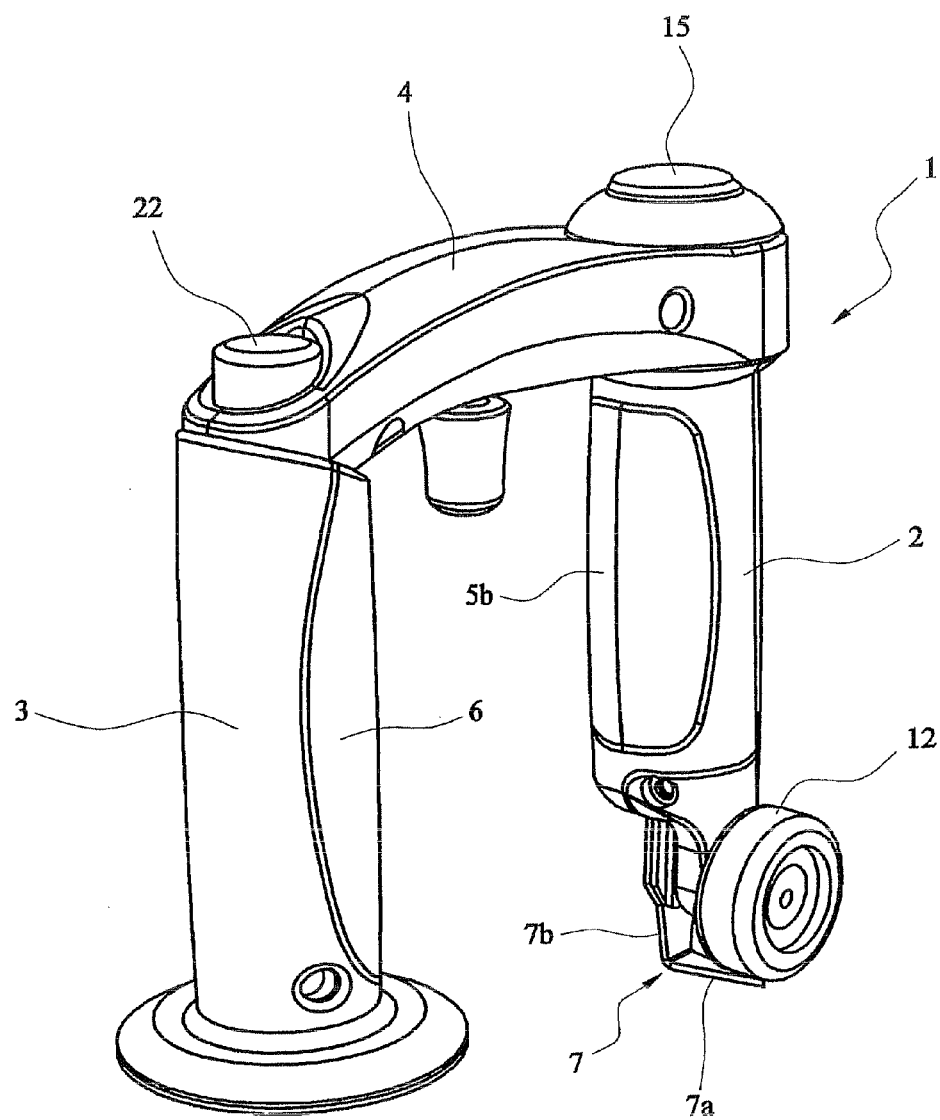
FIG. 1 is a perspective view of a first embodiment of cutting device in accordance with the invention.
Figure 2:
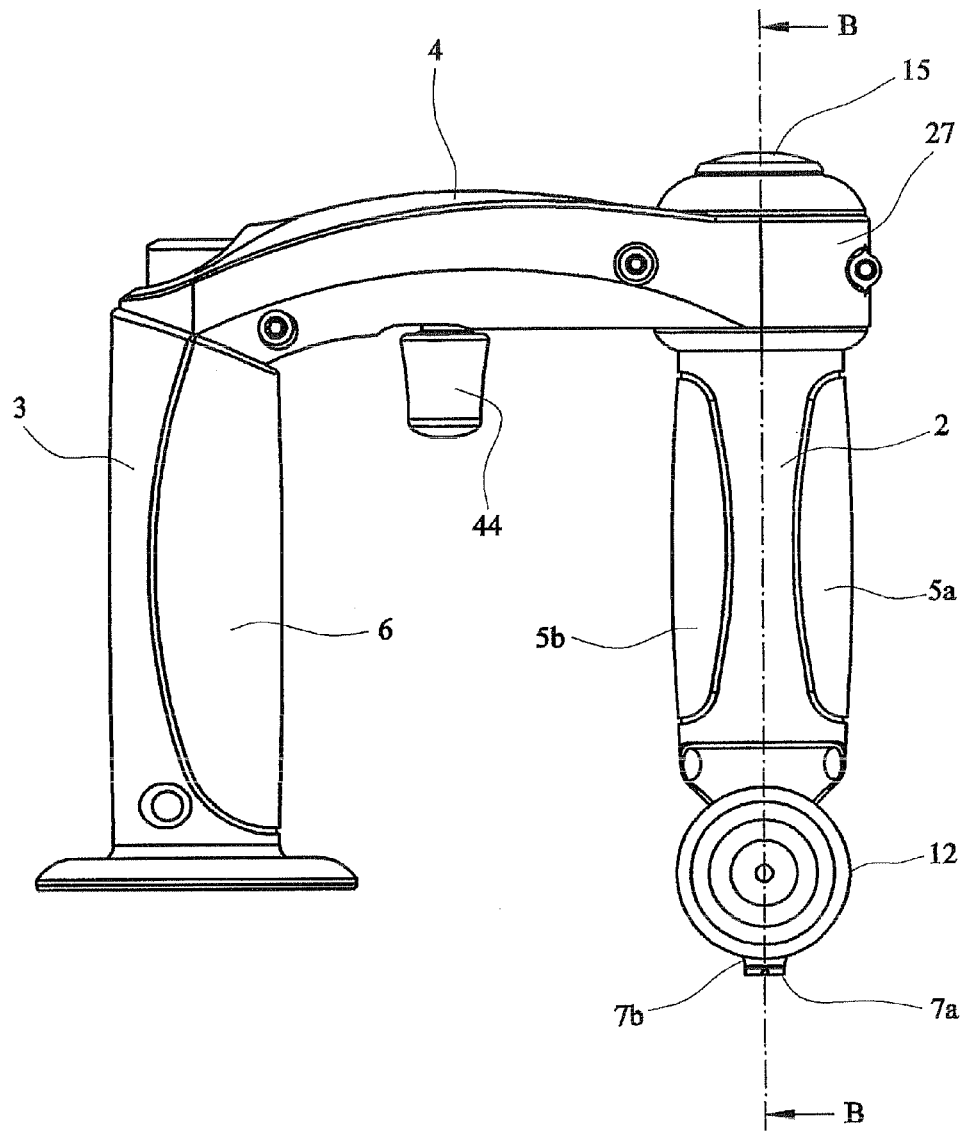
FIG. 2 is a side view of the cutting device of FIG. 1.
Figure 3:
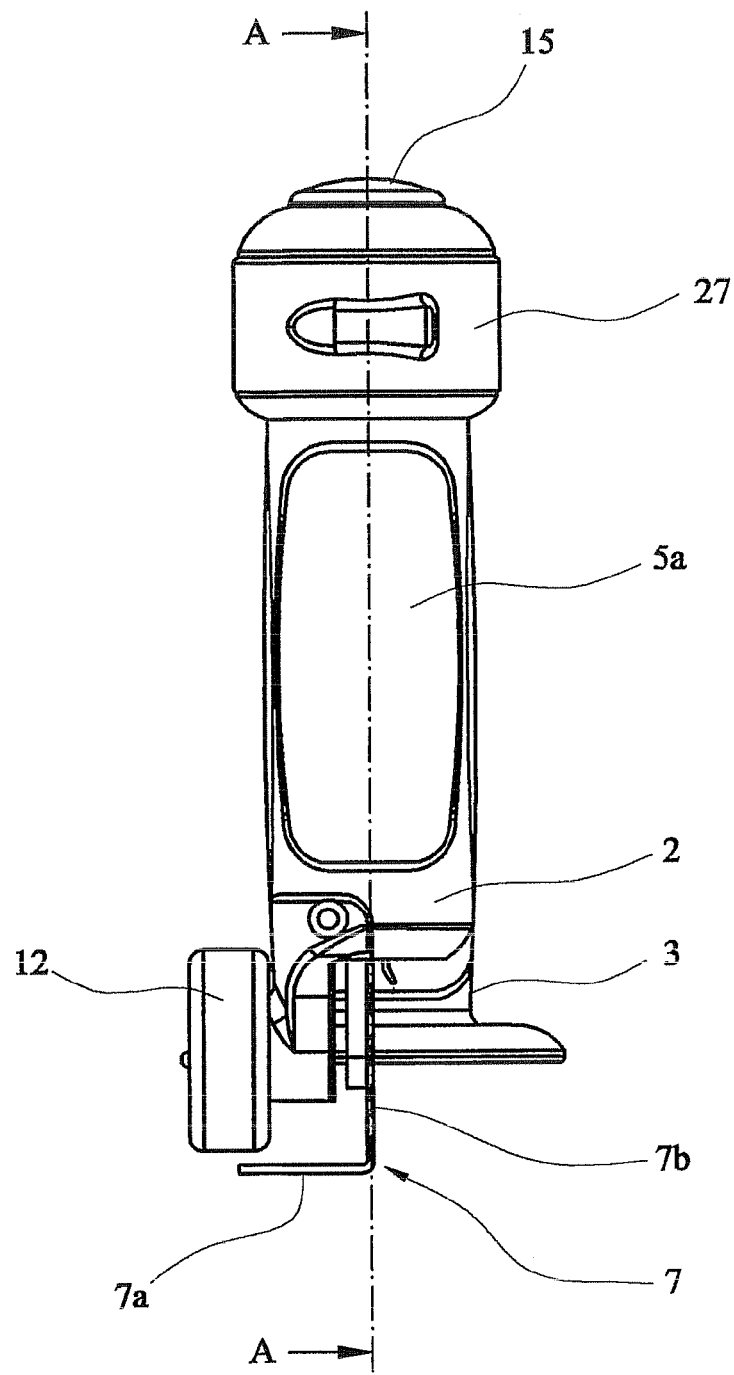
FIG. 3 is a front end view of the device of FIGS. 1 and 2.
Figure 4:
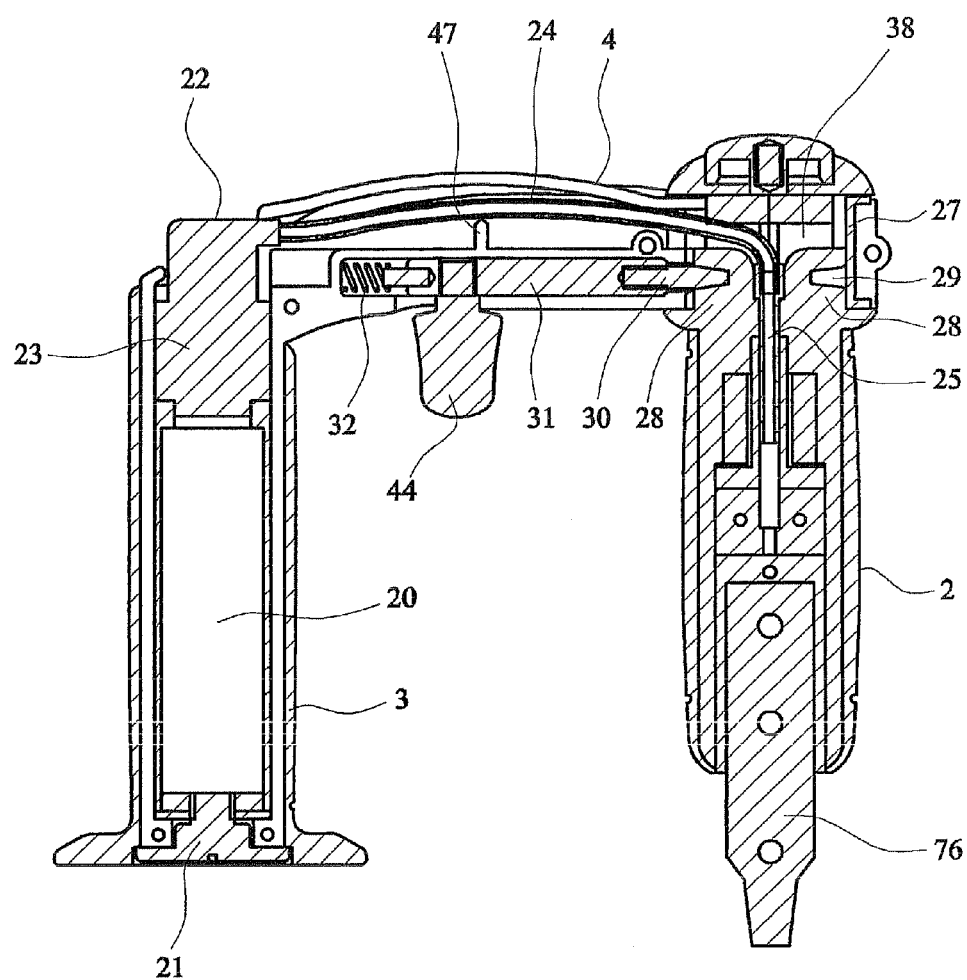
FIG. 4 is a schematic sectional view (along A-A in FIG. 3) of the device of the preceding Figures.

Referring to the drawings, there is shown a cut-out device 1 particularly suited for cutting operations such as cutting, paring or slicing bonding material 50 (typically polyurethane) bonding structural panels, such as for example a vehicle windscreen 51 to a vehicle windscreen opening 52.

The cut-out device 1 has a forward blade support handle 2 and a rearward handle 3 spaced from the forward blade support handle 2 by a bridge portion 4. Forward blade support handle 2 includes rubber grip pads 5a, 5b and rear handle 3 includes rubber grip pad 6 for enhanced ergonomic action and efficiency of use.

Figure 5:
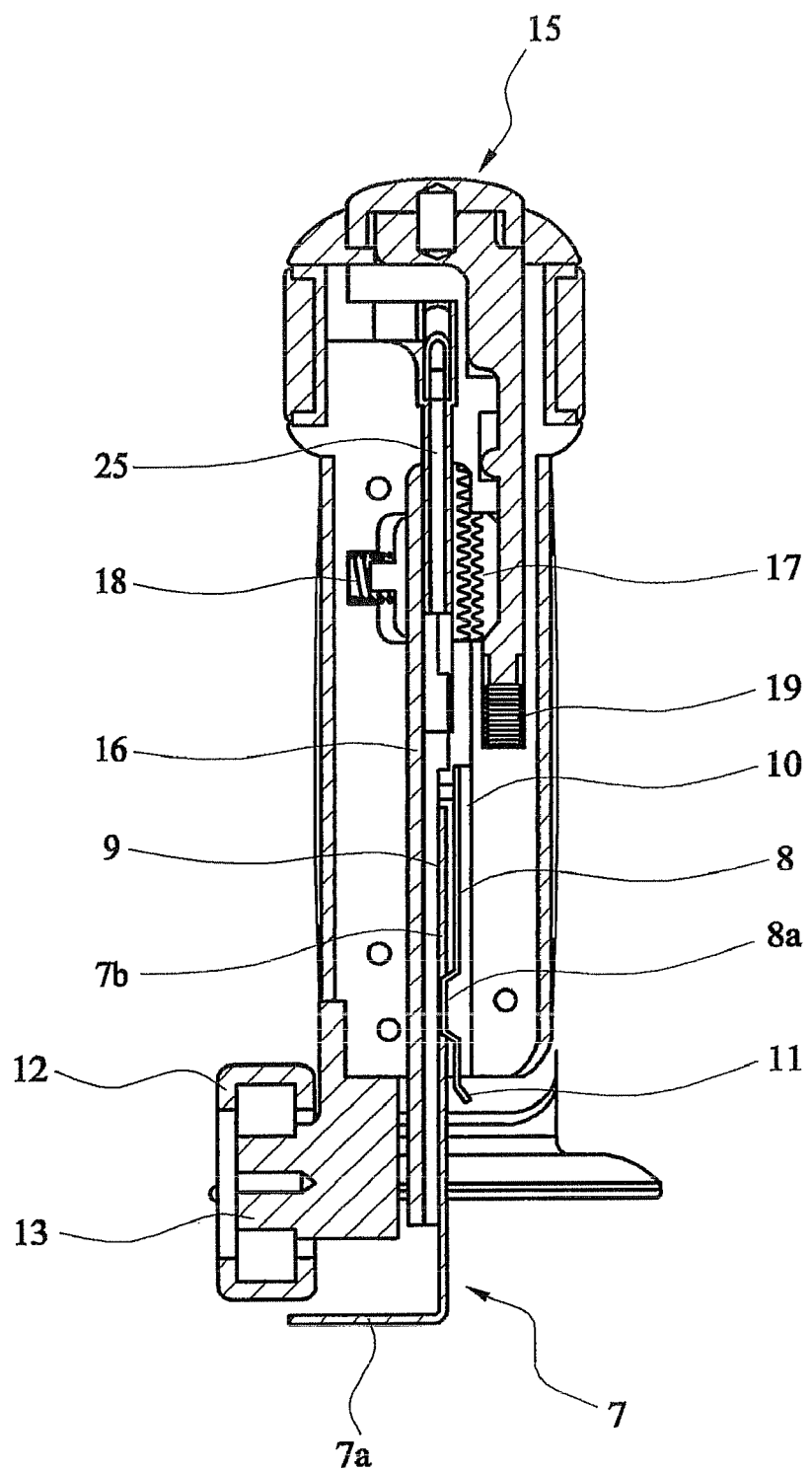
FIG. 5 is a schematic sectional view (along B-B in FIG. 2) of the device of the preceding Figures.

The forward blade support handle 2 acts as a housing and fixing for an "L" shaped cutting blade 7 which has a laterally projecting cutting portion 7a tapering to an apex, and an upwardly projecting fixing length 7b. As shown most clearly in FIG. 5, the fixing length 7b of the blade 7 is received in an internal guide and receiving channel 9 provided in the forward handle 2. The fixing length 7b includes a circular aperture through its thickness dimension into which nestles a projection 8a of a quick release blade fixing leaf spring 8. Leaf spring 8 is fixed at its proximal end 10 and includes a manually accessible tab 11 at its distal end which may be moved outwardly to disengage the projection 8a from engagement with the fixing length 7b of the blade. The leaf spring 8 is normally biased to the engagement position as shown in FIG. 5.

The distal portion of the blade support handle 2 carries a guide roller 12 mounted on a shaft 13. The projecting cutting portion 7a of the blade 7 is below the level of the perimeter of the roller 12. In use, the roller 12 sits on the surface of the windscreen 51 such that the blade cutting portion 7a passes through the polyurethane bonding material 50 present between the windscreen and the support frame 52 of the vehicle windscreen opening. The use of a roller provides good low fiction contact and aids in the ease of use of the device. As an alternative a ski or skid arrangement could be used in place of a roller.

This arrangement provides consistent depth or level of cut of the bonding material as the device is moved about the windscreen. A further feature of the device is the ability to select the depth of cut required by means of adjusting the level of the projecting cutting portion 7a of the blade with respect to the roller 12.

A blade depth adjustment arrangement is accordingly incorporated into the device including a manually accessible button 15 which is depressed in order to increase the depth of cut performed by the blade. The button 15 when depressed advances the blade carrier 16 to increase the spacing of blade portion 7a below the lower most portion of roller 12. A quick release ratchet mechanism 17 including biasing springs 18,19 acts to enable restoration of the blade carrier 16 and blade 7 to a datum orientation when removed from cutting the polyurethane bonding material.

In order to further facilitate the bonding material cutting process the device includes the facility to deliver a cutting lubricant to the location of the cut. The lubricant is delivered internally of the forward handle 2 passing down the fixing portion blade length 7b to the cutting portion 7a. The rear handle 3 includes an internal lubricant reservoir 20 which may be filled via a filling port closed by a stopper 21. A finger or thumb actuated lubricant release button 22 is provided for a pump actuator 23 which pressurizes the fluid in the reservoir 20 causing lubricant to be pumped from the reservoir along a flexible lubricant tube 24 extending internally along the length of the bridge portion 4 to connect with an injector 25 provided internally of the forward handle 2. The lubricant is dispensed from the injector via an internal channel 25 along the fixing length 7b of the blade to be delivered to the cutting portion 7a.

The arrangement of the forward and rear handles 2, 3 and connecting bridge 4 in the same plane (force application plane) and the transverse arrangement of the blade provides a force application plane which is parallel to the cutting plane direction, resulting in a highly efficient cut.

Figure 6:
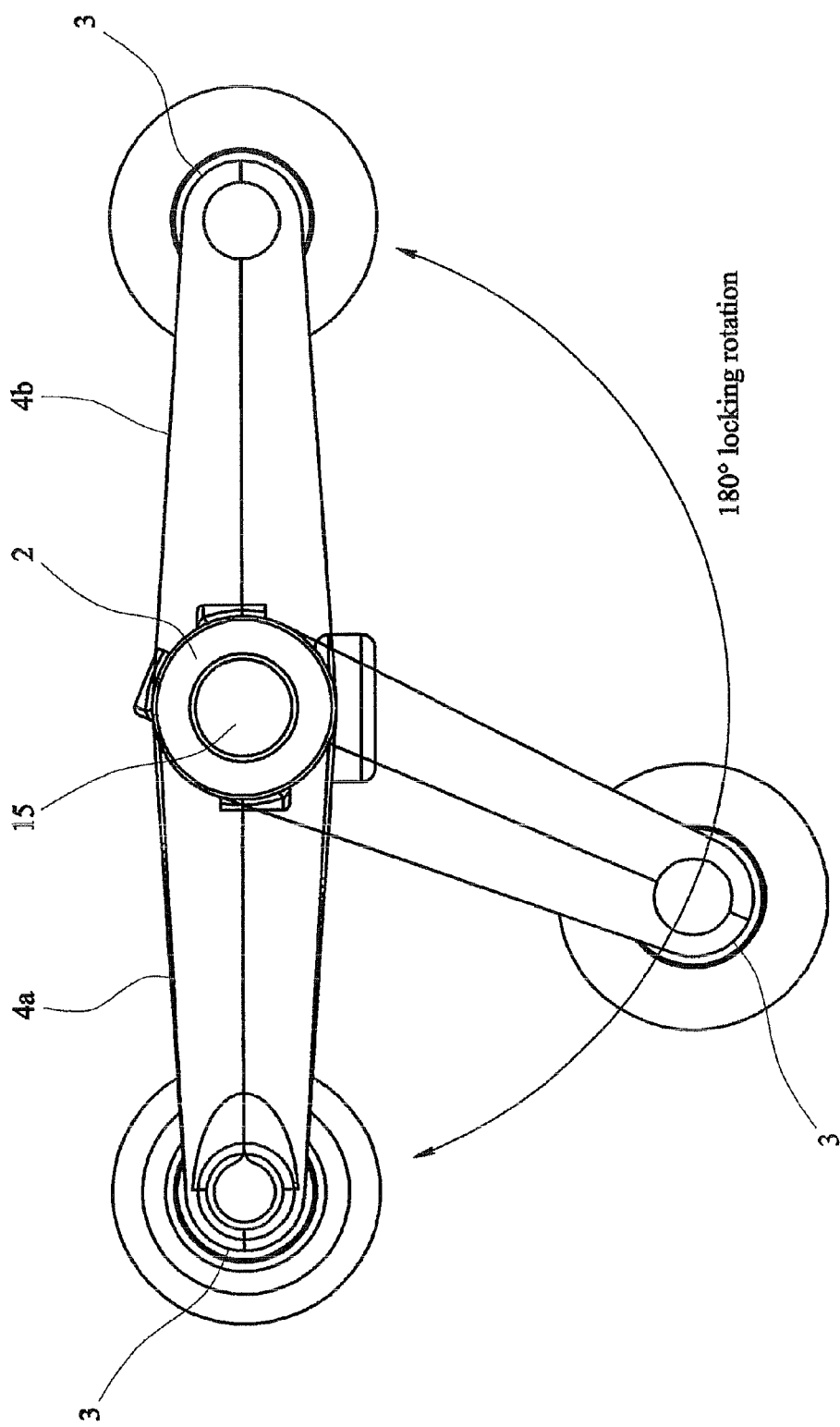
FIG. 6 is a schematic plan view of the device of the previous Figures.
Figure 7:
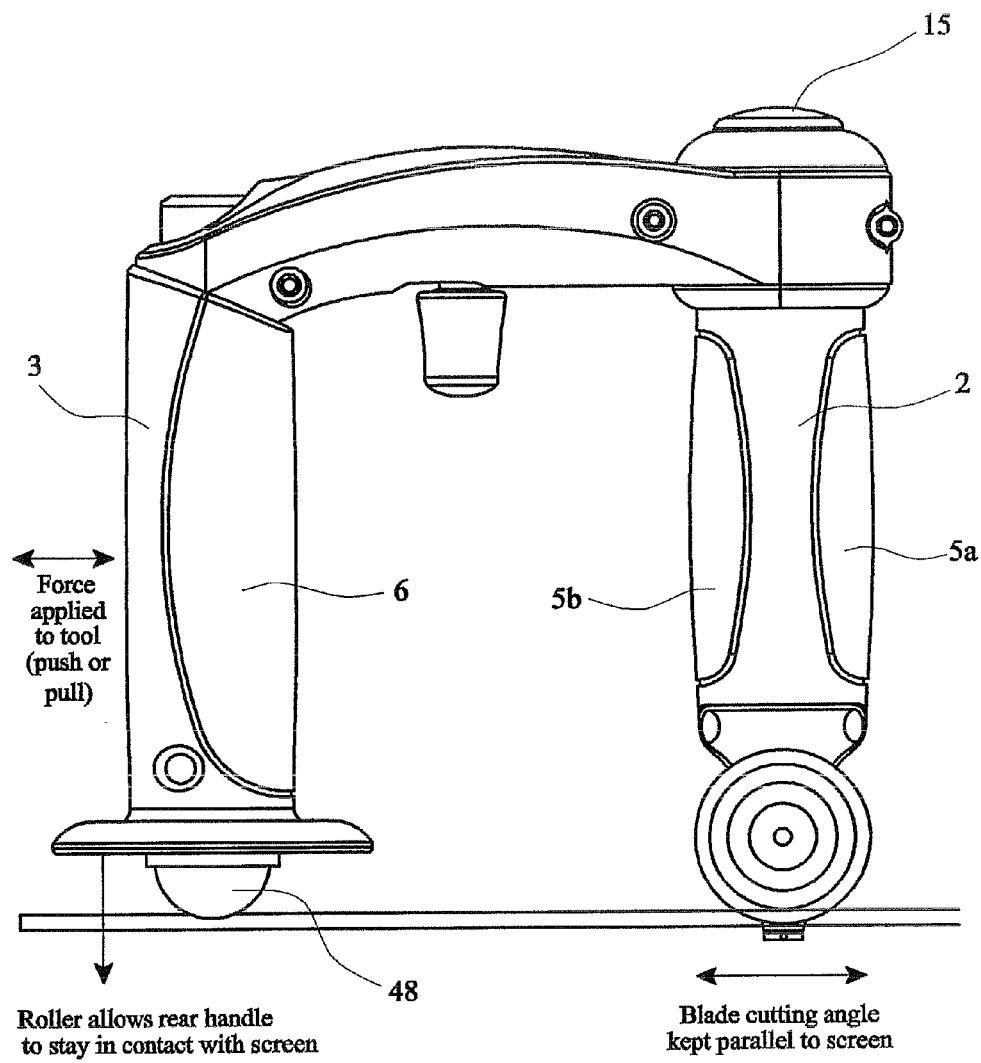
FIG. 7 is a side view of alternative cutting device generally similar to the apparatus of FIGS. 1 to 6.

In order to enable the device to be operated to cut around the corners of the windscreen (or other bonded panel), the device includes the facility for the rear handle 3 and bridge 4 to pivot or rotate about the forward handle 2. A collar 27 forms a forward part of the bridge portion 4 and is bushed to rotate about a boss 28 comprising the forward handle 2. The boss 28 includes a series of shaped recesses 29 shaped and dimensioned to receive, in mating engagement, a spigot 30 attached to a forward portion of a locking bolt 31. Typically the shaped recesses 29 are provided at angular positions 0° and 180° about the boss at least. Such recesses may be provided at 90° intervals or narrower angular spacing. Spacing at 0° and 180° enables the handles 2, 3 to lock together at rotationally mirrored positions (see the position of bridge 4a and 4b in FIG. 6) enabling the apparatus to be maneuvered easily about the corner of a windscreen or window pane. The locking bolt 31 is normally biased to an advanced position by means of a spring 32. A finger retractable trigger 44 presents through a slot in the bridge portion 4 to enable the bolt 31 and spigot 30 to be retracted so as to permit rotation of the rear handle 3 and bridge portion 4 about the forward handle 2. The lubricant tube 24 passes through an annular space 38 enabling the tube to swing through the required angular sweep as the handle 3 and bridge portion 4 rotate. The tube 24 presses against rib 47 when the pump button 2 is pressed to aid pumping of the lubricant.

The rear handle 3 may be held clear of the windscreen surface or alternatively may be provided with contact means to contact the windscreen surface. Such contact means may for example be a roller ball 48 or the like. The provision of a roller ball 48 contact at the base of the rear handle 3 assists the operator to maintain a direction of pull and push force on the device which is parallel to the blade cutting direction. With the aid of pressure on the glass from the handle 3 by the operator and point contact on the screen (with 4 degrees of freedom) provided by the roller ball 48, irrespective of the direction of the resultant force applied by the operator, the horizontal component of the force will always remain parallel to the glass screen surface. The device also provides rigid parallelogram frame thus insuring minimization of the force components which are not in line with blade cutting direction. Consequently there is minimal tilt of the blade cutting portion 7a and therefore minimal friction and resistance which would otherwise occur due to non-optimization of cutting angle. This results in less effort required in the cutting process. In addition, the roller ball provides ergonomic benefits enabling maximum force to be applied by the user's arms and shoulders independent of the orientation of the remainder of the user's body. An additional benefit of the device is increased maneuverability providing ease of movement around the corners and at the point of insertion of blade cutting portion 7a at the start of the cutting process.

As an alternative to a roller ball 48 arrangement, a ski or skid arrangement may be provided as contact means for the rear handle 3.

In use, the rear handle 3 and bridge 4 are rotated about the forward handle 2 by 90 from the position shown in FIG. 1 such that the cutting portion 7a of the blade 7 points away from the rear handle 3 with the blade apex in alignment with the rear handle 3 bridge portion 4 and forward handle alignment plane. In this configuration, the user can grip the device solidly with both hands and make an insertion cut into the polyurethane bonding material with the apex of the cutting portion 7a of the blade 7. This facility enables controlled and accurate user positioning of the blade for the insertion cut and application of maximum user force or insertion in a controlled manner. In addition to producing a technically accurate blade insertion, user safety is also maximized.

Figure 8:
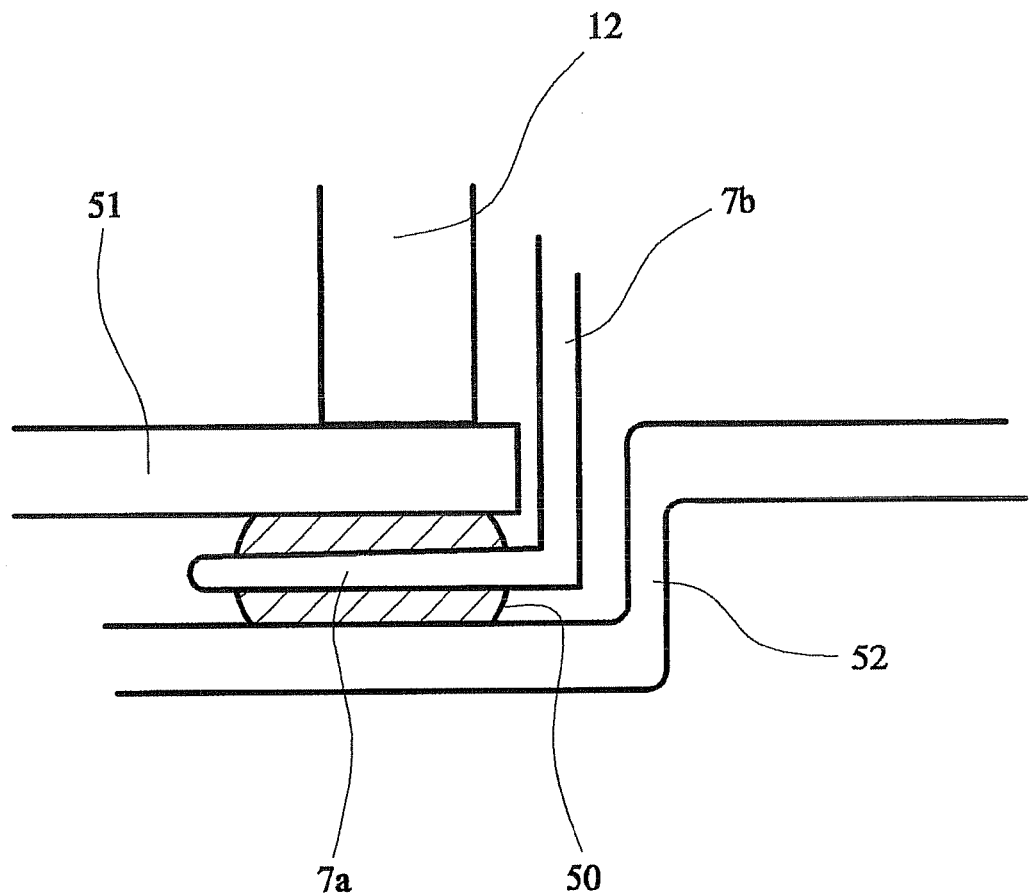
FIG. 8 is a schematic sectional view showing the cutting of a bonded joint, in particular a windscreen or other element, bonded to a support surround by means of a polyurethane bonding bead.

With the blade 7a now embedded in the polyurethane bonding bead 30 as shown in FIG. 8), the rear handle 3 and bridge 4 are rotated back through 90 to the configuration shown in FIG. 1. The device 1 can then be operated in an ergonomic two handed fashion by the user, the blade 7a being dragged through the bonding bead 30 to separate the windscreen 31 (or other panel or element) from the support surround 32. The depth of cut can be altered manually by the user using the blade height adjustment facility of the device (button 15 and associated corner 16 and ratchet mechanism 17). The cutting portion 7a of the blade can be lubricated with lubricant in the manner described above at the discretion of the user.

In order to pass around an edge of the windscreen whilst cutting, the user disengages the spigot 30 from engagement with a respective recess 29 and rotates the rear handle 3 and bridge 4 by 180° about the forward handle 2 and once again locks the handles 2, 3 and bridge 4 in a locked orientation permitting the tool to be continued to be dragged about the screen.

The cut out device of the invention provides significant benefits in terms of ease and accuracy of use, quality of cut achieved and speed of operation. In addition, health and safety benefits are observed for the user. Specific benefits and advantages are described hereafter.

The device provides a manual tool for hand held operation, having a blade where the cutting edge is maintained parallel to the windscreen and user body such that minimum cutting force and minimum friction is experienced. The parallelogram double handle ensures an ergonomic orientation which provides an optimum condition for transmission of force from the user's shoulder and elbows to the tool which is in turn transmitted to the cutting edge of the blade.

The device ensures the cutting plane and force application plane is maintained in parallel through effectively controlled device adjustment features and a flexible guiding system. Also the use of a roller and/or roller ball minimizes any adverse friction. The rigid structure of the handles and bridge requires a change of orientation in order to cut around corners or bends which is achieved by an axial rotation of the rear handle and bridge in relation the forward handle blade holder arrangement. The trigger 44 is retracted to facilitate release of the rotation lock enabling rotation up to 360° in a controlled manner with pre-set friction. The arrangement is capable of pre-set locking at 0°, 180° or other angles as the user may require.

The cutting height of the blade 7a is determined and selected by the user for example to leave a predetermined amount of residual bonding material present. The blade quick release system enables replacement of blade with ease, whilst maintaining the correct stiffness for cutting operation.

The use of liquid lubricant dispensed at correct time and location to reduce the friction between the blade and the polyurethane has proven to reduce effort. Furthermore when applied with the blade in parallel to the cutting surface, combined with less force, such reduction in friction results in lower required cutting force. The lubricant dispensing system may be provided as a disposable item, which enables easy replacement.

Certain novel and inventive features of blade design particularly suited to the use of the present invention have also been developed. FIG. 9 shows a cutting blade 7 having a cutting portion 7a tapering to an apex 61 and including a pair of opposed tapering cutting edges 7g, 7f each having a respective cutting edge bevel angle A, B. In production versions of the blade, the blade 7 is bent to a right angle to have fixing portion 7b and cutting portion 7a extending in mutually perpendicular directions. For the purposes of testing, the blade 7 was used in a flat, unbent condition. The tapering edges 7g, 7f are beveled such that the bevels merge at the apex 61.

Figure 15:
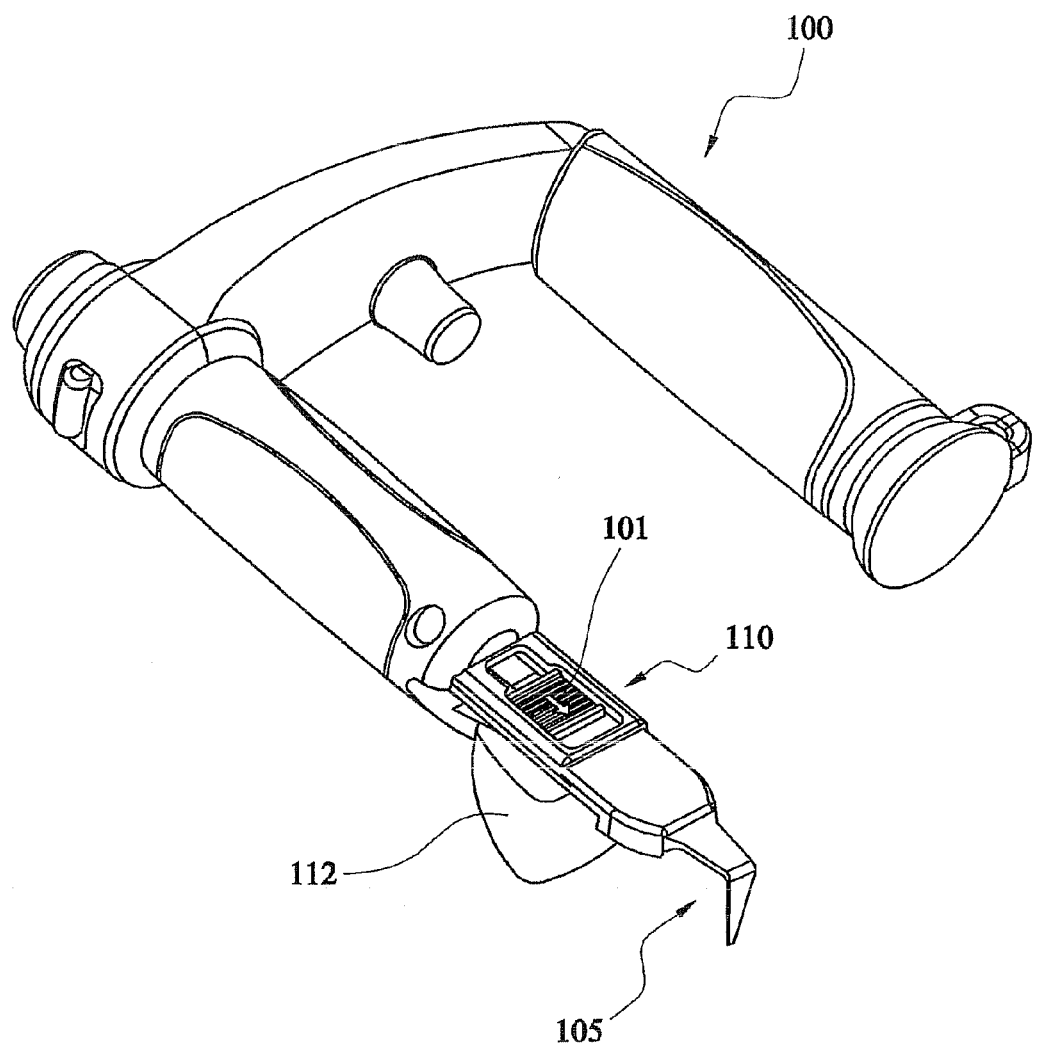
FIG. 15 is a schematic perspective view of a modified embodiment of cutting device in accordance with the invention.
Figure 16:
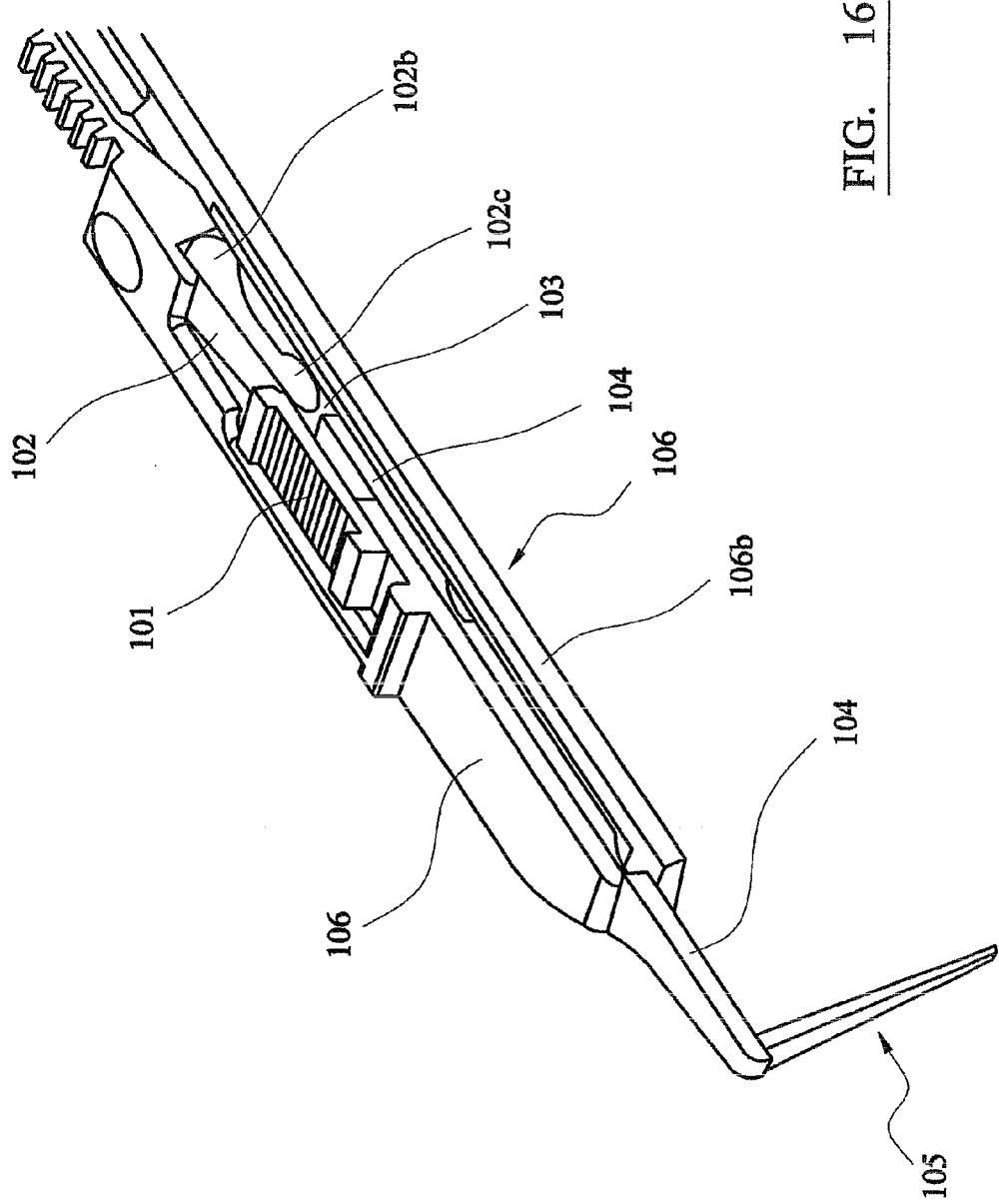
FIG. 16 is a detailed, part sectional view of the embodiment of FIG. 15.

Referring now to FIGS. 15 and 16 there is shown an alternative embodiment of cut-out device 100 which is generally similar in most constructional and operational aspects to the earlier described embodiment. In this embodiment the roller 12 is replaced by a forward support skid 112 and a blade quick release/quick change arrangement 110 is provided.

For the blade quick release arrangement 110, an externally accessible button 101 is biased by a spring (not shown) to urge hook 102 to an engagement position in which it is received within an aperture 103 through a tang 104 of an L-shaped cut-out blade 105. Urging the release button 101 downwardly against the biasing spring enables the tang 104 of blade 105 to be retracted from the space between wall/106a, 106b of the blade housing 106. The hook 102 pivots about a bulbous end 102b and the locating hook end 102c is provided with chamfered portions permitting the blade to be inserted and retracted and engage with the aperture 103.

In order to evaluate the cutting forces when using the blade 7 in the windscreen cut-out 1 tool a trial was implemented using standard silicon rubber test media and test blades manufactured with differing sharp edge geometry.

Test blades were jigged on a servo driven slide providing blade speed and positional control. The silicon rubber test media used was in the form of 8 mm square section extrusion 64 of 70-shore hardness, and treated to achieve consistent properties. The rubber 64 was mounted on a platform load cell in a former which presented a concave shape towards the blade as this was thought to increase the tendency for the rubber to grip the blade. In plan view (see FIG. 9) the rubber 64 was aligned 8 mm from the apex 61 of the blade 7 so that it would be cut in the middle of what would be the working area of the cranked end of a production blade. The attitude of the centerline of the blade was normal to the direction of travel and thus the reaction force between the rubber and blade would be measured by one of the orthogonal axis of the load cell.

A PC was used to control the motions of the blade (i.e. slide) and also to capture the load cell data. Before tests commenced the load cell/conditioning amplifier and software data routine were calibrated and sensitivity set to enable full-scale output of the amplifier at 500N.

1.25 mm thick 0.8% C steel was readily available from which to manufacture the test blades. For convenience the test pieces were made flat and the ground edges were produced after hardening and tempering to 50 Rc. Sharpened bevels were produced one side at a time using a general purpose wheel on a tool room surface grinder. For this trial 20° angle would be the minimum due to the thinner material and the increased bevel width. The line of intersection of these reaches further back from the tip and actually results in a reduction of blade thickness along this slope.

Four samples of single and double beveled profiles with 50°, 40°, 30° and 20° included angles were tested.

A cutting stroke of 18 mm was used to ensure the entire blade cut completely through the media and at a speed of 20 mm/sec. As a consequence of this a force curve similar in shape to that in FIG. 12 was obtained. The rising force to the first peak is the result of a build up of the compressive force between rubber and blade cutting edge until the point where the rubber is actually penetrated (the peak). From this point there is a slight reduction to the beginnings of a plateau area where some or the entire blade is enclosed by the rubber. Next follows a decay as the blade exits the rubber.

Figures 13, 14:
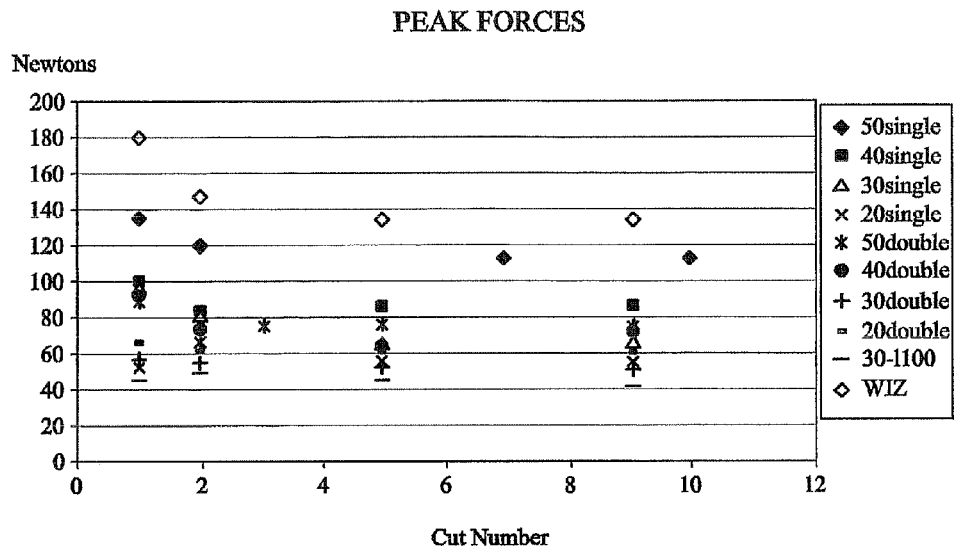
FIG. 13 is a plot showing the force encountered in a test procedure involving various blades.
FIG. 14 is a table of test results.

As a measure of the initial sharpness of the blade the peak force reading was recorded. 9/10 cuts per blade were carried out and the peak force recorded on cuts 1, 2, 5, 9. This was a precautionary measure to see whether the first readings may be affected by burrs produced when grinding. For additional comparison the 50 double sample was then re-sharpened at 30 included angle using a sharpening machine, which has spiral-interlocking wheels and grinds both sides simultaneously. This was then tested along with a straightened out WIZ blade. FIGS. 13 and 14 show the results obtained.

The forces measured on each blade showed reasonably good correlation. There was little adverse affect from burrs. Each blade demonstrated a slight fall off in measured peak force over the 9 cuts. Generally the blades in each series were ranked according to included angle and angle for angle double bevels lower forces than single, with the exception of one anomaly the 20° double blade. These results are sufficient to show that a double beveled shallower angled blade will have a lower cutting force than the current production (45° single).

Various aspects of the invention have been primarily described in relation to a cut-out device for use in removal or releasing of vehicle windscreens bonded in a vehicle windscreen opening by an interposed polyurethane bonding bead. It will be appreciated that the invention has applicability in other situations for example in paring or refresh scraping polyurethane or other plastics material or for example in removal of architectural window panes or other panels or components bonded to substrates by peripherally accessible bonding material. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A windshield cut-out tool for use in removing a vehicle windshield, the tool comprising:
   an elongate forward blade carrier providing a forward handle for the tool;
   an elongate rearward handle spaced from and substantially parallel to the forward blade carrier;
   a bridge portion, interconnecting the forward blade carrier and the rearward handle to form a rigid frame wherein both the forward blade carrier and the rearward handle extend from the bridge portion parallel to one another in respective fixed longitudinal directions, and wherein the forward blade carrier and the bridge portion and the rearward handle are decoupled from the vehicle windshield and positioned above the vehicle windshield and moveable together as parts of the rigid frame in an unrestrained manner over the vehicle windshield;
   a rotatable mounting mechanism enabling rotation of the forward blade carrier with respect to the bridge portion and the rearward handle about a rotational axis oriented in the longitudinal direction of the forward blade carrier in order to reconfigure the tool; and
   a locking mechanism for fixing rotational orientation of the forward blade carrier with respect to the bridge portion and the rearward handle, wherein the locking mechanism fixes rotational orientation of the forward blade carrier in a user-selected one of a plurality of rotational orientations about the rotational axis of the forward blade carrier;
   wherein the forward blade carrier includes blade securing means for securing the blade in a position on the rotational axis of the forward blade carrier, and an engagement means is rigidly coupled to the forward blade carrier and moveable with the forward blade carrier, the engagement means including an element that contacts the vehicle windshield at a level spaced above a terminal portion of the blade secured by the blade securing means and that moves along the vehicle windshield during cutting operations performed by the blade.

2. A windshield cut-out tool according to claim 1, wherein: the rearward handle is rotatable in an arc about the forward blade carrier.

3. A windshield cut-out tool according to claim 1, wherein: the rearward handle is rotatable about the forward blade carrier through an angle that includes at least one of 90 degrees, 180 degrees, 270 degrees and 360 degrees.

4. A windshield cut-out tool according to claim 1, wherein: the locking mechanism comprises a lock actuator accessible to a user of the device.

5. A windshield cut-out tool according to claim 4, wherein: the locking mechanism comprises a biasing arrangement for biasing the lock actuator in a normally locked position.

6. A windshield cut-out tool according to claim 4, wherein: the lock actuator is housed in the bridge portion.

7. A windshield cut-out tool according to claim 1, wherein: the forward blade carrier includes an external surface portion providing a forward handle.

8. A windshield cut-out tool according to claim 1, further comprising:
   a blade adjustment arrangement for adjusting the position of a blade relative to the forward blade carrier.

9. A windshield cut-out tool according to claim 8, wherein: the blade adjustment arrangement comprises at least one of: an actuator provided on the exterior of the device and a ratchet mechanism adapted to advance and/or retract the blade relative to the forward blade carrier.

10. A windshield cut-out tool according to claim 1, wherein:
    the forward blade carrier includes at least one of: an internal receiving recess for receiving a blade and a blade retaining element for securing a blade to the forward blade carrier.

11. A windshield cut-out tool according to claim 10, wherein:
    the blade retaining element is resiliently biased in a retaining position.

12. A windshield cut-out tool according to claim 1, wherein:
    the element is rotatable.

13. A windshield cut-out tool according to claim 1, further comprising:
    a blade which includes an elongate mounting portion for mounting to the forward blade carrier and a cutting portion extending transversely to the mounting portion.

14. A windshield cut-out tool according to claim 13, wherein:
    the cutting portion of the blade extends transverse to the rotational axis of the forward blade carrier.

15. A windshield cut-out tool according to claim 1, further comprising:
    a lubrication arrangement for delivering lubricant to a blade carried by the forward blade carrier.

16. A windshield cut-out tool according to claim 15, wherein:
    the lubrication arrangement includes at least one of:
    i) a lubricant reservoir
    ii) delivery means for delivering the lubricant via the forward blade carrier to a blade carried therein;
    iii) a conduit spanning the bridge portion,
    iv) a lubricant injector or nozzle that is part of the forward blade carrier, which is arranged to dispense lubricant to a portion of a blade carried therein, and
    v) a lubricant delivery actuator that is mounted on the exterior of the device.

17. A windshield cut-out tool according to claim 1, further comprising:
    a blade having a fixing portion and a cutting portion extending substantially transverse to the fixing portion.

18. A windshield cut-out tool according to claim 1, wherein:
    the forward blade carrier includes a mounting means for mounting a non-reciprocating blade, the blade extending from the forward blade carrier beyond said engagement means.

19. A windshield cut-out tool according to claim 18, wherein:
    the blade has a top portion and a bottom portion that extend at right angles relative to one another.

20. A windshield cut-out tool according to claim 19, wherein:
    the top portion of said blade is mounted along the rotational axis of the forward blade carrier.

21. A method of removing a vehicle windshield comprising:
    providing the windshield cut-out tool of claim 1; and
    reconfiguring the tool by operating the rotatable mounting mechanism to rotate the forward blade carrier with respect to the rearward handle about a rotational axis orientated in the longitudinal direction of the forward blade carrier of the tool.

22. A method according to claim 21, wherein:
    the forward blade carrier is non-motorized and non-reciprocating during vehicle windshield cutout operations.

* * * * *